United States Patent
Kovalchuk et al.

(10) Patent No.: US 10,767,101 B2
(45) Date of Patent: Sep. 8, 2020

(54) METHODS OF CONTROLLING FINES MIGRATION IN A WELL

(71) Applicants: Anton Kovalchuk, Houston, TX (US); Ramon Garza, Pearland, TX (US)

(72) Inventors: Anton Kovalchuk, Houston, TX (US); Ramon Garza, Pearland, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 229 days.

(21) Appl. No.: 16/021,142

(22) Filed: Jun. 28, 2018

(65) Prior Publication Data

US 2020/0002601 A1   Jan. 2, 2020

(51) Int. Cl.

| | |
|---|---|
| *E21B 43/04* | (2006.01) |
| *E21B 43/267* | (2006.01) |
| *C09K 8/80* | (2006.01) |
| *C09K 8/575* | (2006.01) |
| *C09K 8/68* | (2006.01) |
| *C09K 8/74* | (2006.01) |
| *E21B 43/20* | (2006.01) |
| *E21B 43/26* | (2006.01) |
| *C09K 8/516* | (2006.01) |

(52) U.S. Cl.
CPC ............ *C09K 8/5751* (2013.01); *C09K 8/516* (2013.01); *C09K 8/68* (2013.01); *C09K 8/74* (2013.01); *C09K 8/80* (2013.01); *C09K 8/805* (2013.01); *E21B 43/04* (2013.01); *E21B 43/20* (2013.01); *E21B 43/26* (2013.01); *E21B 43/267* (2013.01)

(58) Field of Classification Search
CPC ........ E21B 43/02; E21B 43/025; E21B 43/04; E21B 43/267; C09K 8/805
See application file for complete search history.

(56) References Cited

U.S. PATENT DOCUMENTS

| | | | |
|---|---|---|---|
| 4,713,203 A | 12/1987 | Andrews | |
| 6,582,819 B2 * | 6/2003 | McDaniel | A63K 1/00 166/295 |
| 6,749,025 B1 | 6/2004 | Brannon et al. | |
| 8,127,849 B2 | 3/2012 | Gupta | |
| 8,227,026 B2 * | 7/2012 | McDaniel | C09K 8/805 427/212 |
| 9,879,515 B2 * | 1/2018 | Green | C09K 8/805 |
| 10,017,688 B1 * | 7/2018 | Green | C09K 8/805 |
| 2005/0019574 A1 | 1/2005 | McCrary | |
| 2005/0194141 A1 * | 9/2005 | Sinclair | C09K 8/805 166/280.2 |
| 2011/0253366 A1 | 10/2011 | Berrigan et al. | |
| 2015/0203744 A1 * | 7/2015 | Rappolt | C09K 8/805 166/280.2 |
| 2016/0075940 A1 * | 3/2016 | Rappolt | C09K 8/66 166/280.2 |
| 2018/0237680 A1 | 8/2018 | Hall et al. | |
| 2019/0002753 A1 | 1/2019 | Wilson et al. | |
| 2019/0031950 A1 * | 1/2019 | Bestaoui-Spurr | C09K 8/805 |

OTHER PUBLICATIONS

International Search Report for International Application No. PCT/US2019/034338, International Filing Date May 29, 2019, dated Sep. 16, 2019, 3 pages.
Written Opinion for International Application No. PCT/US2019/034338, International Filing Date May 29, 2019, dated Sep. 16, 2019, 7 pages.

* cited by examiner

*Primary Examiner* — Kenneth L Thompson
(74) *Attorney, Agent, or Firm* — Cantor Colburn LLP

(57) ABSTRACT

A method of treating a subterranean formation penetrated by a wellbore comprises: introducing into the subterranean formation a treatment fluid comprising coated polymeric particles having a polymeric core and a curable thermoset coating disposed on the polymeric core; allowing the curable thermoset coating to cure under downhole conditions; and forming a fluid-permeable pack from the coated polymeric particles, the fluid-permeable pack reducing or substantially preventing the passage of formation particles from the subterranean formation into the wellbore while allowing passage of formation fluids from the subterranean formation into the wellbore.

19 Claims, No Drawings

METHODS OF CONTROLLING FINES MIGRATION IN A WELL

BACKGROUND

The disclosure is directed to methods of treating subterranean formations. More specifically, the disclosure relates to methods of controlling fines migration in a well.

During well stimulation, completion, and production operations, clays, sand, micas, feldspars, plagioclase, or other fine particles may be generated. Fines may result from an unconsolidated or inherently unstable formation, or from the use of an incompatible treatment fluid that liberates fine particles. Other sources of fines include particulates added to the wellbore such as fines present in a proppant or produced from partially crushed proppant.

Once generated, formation fines may migrate toward the near wellbore area due to drag or other forces. The migrated fines can plug, erode or cause significant wear of downhole equipment and surface facilities. The fines can also plug or clog flow channels in the formation, thereby significantly reducing well productivity. Thus it would be desirable to provide a method to fix or stabilize fines within a subterranean formation or to filter fines out of the desired production material so that fines migration is reduced or substantially prevented.

BRIEF DESCRIPTION

A method of treating a subterranean formation penetrated by a wellbore comprises: introducing into the subterranean formation a treatment fluid comprising coated polymeric particles having a polymeric core and a curable thermoset coating disposed on the polymeric core, the polymeric core comprising a rubber, an epoxy, a phenolic resin, a thermoplastic polymer or a combination comprising at least one of the foregoing, the rubber comprising a nitrile rubber (NBR), a hydrogenated nitrile rubber (HNBR), a styrene-butadiene rubber (SBR), an ethylene propylene diene monomer rubber (EPDM), a natural rubber, a silicone rubber, a polybutadiene, polyisoprene, butyl rubber, or a combination comprising at least one of the foregoing, and the thermoplastic polymer comprising polyetheretherketone (PEEK), a polyimide, a polysulfone, a polyester or polycarbonate; allowing the curable thermoset coating to cure under downhole conditions; and forming a fluid-permeable pack from the coated polymeric particles, the fluid-permeable pack reducing or substantially preventing the passage of formation particles from the subterranean formation into the wellbore while allowing passage of formation fluids from the subterranean formation into the wellbore.

Coated polymeric particles comprises: a recycled polymeric core in a particulate form, and a curable coating disposed on the polymeric core, wherein recycled polymeric core has a size of about 3.5 to 40 mesh and comprises nitrile rubber (NBR), hydrogenated nitrile rubber (HNBR), styrene-butadiene rubber (SBR), ethylene propylene diene monomer rubber (EPDM), natural rubber, silicone rubber, polybutadiene, polyisoprene, butyl rubber, rubber blend, polyetheretherketone (PEEK), polyamide, polyimide, polysulfone, polyester, polycarbonate, or a combination comprising at least one of the foregoing.

DETAILED DESCRIPTION

It has been found that coated polymeric particles such as coated recycled rubber can effectively consolidate formation fines and/or filter fines out of the desired production material, minimizing or avoiding the problems associated with fines migration. In particular, the inventors have found that coated polymeric particles can form a fluid-permeable pack which is effective in reducing or substantially preventing the passage of formation particles from the subterranean formation into a wellbore while allowing passage of formation fluids from the subterranean formation into the wellbore.

The coated polymeric particles can be introduced into the subterranean formation through a treatment fluid during a downhole operation such as a hydraulic fracturing operation; an acidizing treatment; a gravel packing operation; a flooding operation; or a combination comprising at least one of the foregoing.

In some embodiments, introducing the treatment fluid and the performing the downhole operation occur simultaneously. Depending on the specific operation performed, the treatment fluid can be fracturing fluids, gravel packing fluids, flooding fluids, acidizing fluids, and the like. In addition to the coated polymeric particles, the treatment fluids can contain various components known in the art. For example, fracturing fluids can contain proppant particles. Gravel packing fluids can contain gravels. Acidizing fluids contain an acid such as hydrofluoric acid; hydrochloric acid; acetic acid; formic acid; sulfamic acid; or chloroacetic acid.

In other embodiments, performing the downhole operation precedes introducing the treatment fluid. In these embodiments, the treatment fluid containing the coated polymeric particles can be free of proppant particles, gravels, acids, or other components that may be needed for performing fracturing, gravel packing, acidizing, or flooding operations.

The coated polymeric particles in the treatment fluids comprise a polymeric core and a curable coating disposed on the polymeric core.

The polymeric core can be a rubber, such as a nitrile rubber (NBR), hydrogenated nitrile rubber (HNBR), styrene-butadiene rubber (SBR), ethylene propylene diene monomer rubber (EPDM), natural rubber, silicone rubber, polybutadiene, polyisoprene, butyl rubber, or a combination comprising at least one of the foregoing.

The polymeric core can also be thermosets such as epoxy, phenolic, and the like or thermoplastics such as polyetheretherketone (PEEK), polyimide, polysulfone, polycarbonate, or a combination comprising at least one of the foregoing.

Advantageously, the polymeric core can be a recycled thermoset such as a recycled rubber, a recycled thermoplastic material, or a combination thereof. The recycled materials are environmentally friendly and low cost. The inventors have found that the particular recycled polymeric materials as disclosed herein can meet the requirements for the polymeric core in the context of sand control applications.

Particularly preferred polymeric core s recycled rubber in a particulate form. As used herein, recycled rubber refers to a rubber produced from used rubber products such as used tires. Recycled rubber can be made by pulverizing discarded rubber products at room temperature. Recycled rubber can also be made via a cryogenic process where the used rubber products are frozen to a cryogenic temperature then broken into particles or small pieces. The recycled rubber can have a particle size of about 3.5 to about 40 mesh.

The polymeric core a curable coating, which cures subsurface, e.g. downhole or in a fracture. As used herein, a curable coating means that the material for the coating can be polymerized or crosslinked, preferably under downhole conditions.

Examples of the curable thermoset coating includes uncured or partially cured thermosets such as epoxy resin, phenolic resin, vinyl ester resin, furan resin, polyurethane, polyester, cyanate ester, polyimide, bismaleimide, liquid rubber or a combination comprising at least one of the foregoing.

In an embodiment, the coating includes a curing agent. The curing agent can be nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; elemental sulfur, sulfur-containing compounds such as polysulfides, polymercaptans; peroxides; catalytic curing agents such as tertiary amines, Lewis acids, Lewis bases; or a combination thereof.

According to an embodiment, the coating is disposed on the polymeric core by mixing in a vessel, e.g., a reactor. Individual components, e.g., the polymeric core and resin materials (e.g., monomers and/or oligomers used to form a curable thermoset coating) are combined in the vessel to form a reaction mixture and are agitated to mix the components. Further, the reaction mixture is heated at a temperature or at a pressure commensurate with forming the coating. In another embodiment, the coating is disposed on the polymeric core via spraying such as by contacting the polymeric core with a spray of the coating material.

The coated polymeric particles have a size from about 50 µm to about 8,000 µm, specifically about 100 µm to about 7,000 µm, and more specifically about 1,000 µm to about 7,000 µm. Further, the coated polymeric particles have any shape including spherical, angular, and polyhedral and are monodisperse or polydisperse with an average particle size distribution that is unimodal or multimodal, e.g., bimodal. The thickness of the curable thermoset coating can be about 5 µm to about 500 µm or about 10 µm to about 50 µm.

The coated polymeric particles are lightweight and can be conveniently injected downhole together with a carrier fluid. In an embodiment the coated polymeric particles have a true specific gravity of less than about 2 g/cc or about 0.5 g/cc to about 1.5 g/cc.

The coated polymeric particles as disclosed herein are stable at temperatures of up to about 350° F. or up to about 300° F., thus providing a broader service temperature range compared to shape memory polymers.

In an embodiment, the coated polymeric particles are present in an amount effective to form a permeable pack in about 10 minutes to about 48 hours, about 30 minutes to about 36 hours, about 1 hour to about 24 hours, or about 2 hours to about 20 hours after injected into the wellbore. In another embodiment, the treatment fluids can contain about 0.5 to about 10 lb/gal, or about 1 to about 5 lb/gal of the coated polymeric particles.

Optionally, the coated polymeric particles are used together with coated or uncoated proppants. The coating for the proppant can be the same as the coating for the coated polymeric particles. The proppant particles include a ceramic, sand, a mineral, a nut shell, gravel, glass, or a combination thereof. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Badger sand, Brady sand, and Ottawa sand. In an embodiment, the proppant particles made of a mineral such as bauxite are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

If used, the weight ratio of the coated polymeric particles relative to the proppant is about 10:90 to about 90:10 or about 30:70 to about 70:30. In an embodiment, the coated polymeric particles are not used together with any proppant. In other words, that the treatment fluids that contain the coated thermoset can be free of proppants, coated or uncoated.

The treatment fluids can further comprise an aqueous carrier fluid. The aqueous carrier fluid is present in an amount of about 10% to about 99% by weight, more specifically in an amount of about 20% to about 99% by weight, based on the total weight of the treatment fluids depending on the end use of the fluid. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$) to increase the density of the brine, such as 10.6 pounds per gallon of $CaCl_2$) brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$), $CaBr_2$, $ZnBr_2$, $NH_4Cl$, sodium formate, cesium formate, and combinations comprising at least one of the foregoing. The NaCl salt can be present in the brine in an amount of about 0.5 to about 25 weight percent (wt. %), specifically about 1 to about 15 wt. %, and more specifically about 3 to about 10 wt. %, based on the weight of the brine.

The aqueous carrier fluid of the treatment fluids can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the treatment fluids in an amount of about 1% to about 5% by volume of water in the treatment fluids.

The various treatment fluids can be varied and adjusted according to well control and compatibility parameters of the particular fluid with which it is associated for example a fracturing fluid, an acidizing fluid, and the like. The treatment fluids can be used to reduce or substantially prevent the migration of fines in the subterranean formation and can be used in vertical, horizontal, or deviated wellbores.

In general, the components of the treatment fluids can be premixed or is injected into the wellbore without mixing, e.g., injected "on the fly" where the components are combined as they are being injected downhole. A pumpable or pourable treatment fluid can be formed by any suitable method. In an exemplary embodiment, the components of the treatment fluid are combined using conventional mixing equipment or equipment used in downhole operations. The treatment fluid can then be injected, e.g., pumped and placed by various conventional pumps and tools to any desired location within the wellbore. In an embodiment, injecting the treatment fluid comprises pumping the fluid via a tubular in the wellbore. For example, the treatment fluid can be pumped into an annulus between a tubular and a wall of the wellbore via the tubular.

Once the treatment fluid has been placed in the desired location, for example a position that is adjacent to a subterranean formation, the curable coating on the coated polymeric particles is cured. During the curing, the coated polymeric particles are consolidated forming a fluid-permeable pack. The fluid-permeable pack reduces or substantially prevents the passage of formation particles from the subterranean formation into the wellbore while allowing passage of formation fluids from the subterranean formation into the wellbore. A method of reducing fines migration thus comprises introducing into the subterranean formation a treatment fluid comprising coated polymeric particles; curing the coating on these polymeric particles, and consolidating coated polymeric particles forming the fluid-permeable pack.

The permeability of the fluid-permeable pack can be controlled by turning the particle size of the coated polymeric particles, the material of the coating, as well as the thickness of the coating. Advantageously, the fluid-permeable pack is effective in reducing or substantially preventing the passage of formation particles such as formation fines from the subterranean formation into a wellbore while allowing passage of formation fluids from the subterranean formation into the wellbore.

When used in hydraulic fracturing, the coated polymeric particles may be injected into a subterranean formation in conjunction with a hydraulic fracturing treatment or other treatment at pressures sufficiently high enough to cause the formation or enlargement of fractures. Such other treatments may be near wellbore in nature (affecting near wellbore regions) and may be directed toward improving wellbore productivity and/or controlling the production of fracture proppant or formation sand. Particular examples include gravel packing and "frac-packs."

In another exemplary embodiment, after an acidizing treatment or other well stimulation or remediation operations, a treatment fluid containing coated polymeric particles can be introduced into the subterranean formation to form a fluid-permeable pack, which reduces or substantially preventing the passage of formation particles from the subterranean formation into the wellbore while allowing passage of formation fluids from the subterranean formation into the wellbore.

In another exemplary embodiment, a gravel packing operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A treatment fluid including the coated polymeric particles may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the fines migration control method may use the coated polymeric particles in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel packing screen, may be introduced into a wellbore at pressures below, at or above the fracturing pressure of the formation, such as frac pack, and/or may be employed in conjunction with resins such as sand consolidation resins if so desired.

Set forth below are various embodiments of the disclosure.

Embodiment 1

A method of treating a subterranean formation penetrated by a wellbore, the method comprising: introducing into the subterranean formation a treatment fluid comprising coated polymeric particles having a polymeric core and a curable thermoset coating disposed on the polymeric core, the polymeric core comprising a rubber, an epoxy, a phenolic resin, a thermoplastic polymer or a combination comprising at least one of the foregoing, the rubber comprising a nitrile rubber (NBR), a hydrogenated nitrile rubber (HNBR), a styrene-butadiene rubber (SBR), an ethylene propylene diene monomer rubber (EPDM), a natural rubber, a silicone rubber, a polybutadiene, polyisoprene, butyl rubber, or a combination comprising at least one of the foregoing, and the thermoplastic polymer comprising polyetheretherketone (PEEK), a polyimide, a polysulfone, a polyester or polycarbonate; allowing the curable thermoset coating to cure under downhole conditions; and forming a fluid-permeable pack from the coated polymeric particles, the fluid-permeable pack reducing or substantially preventing the passage of formation particles from the subterranean formation into the wellbore while allowing passage of formation fluids from the subterranean formation into the wellbore.

Embodiment 2

The method as in any prior embodiment, wherein the polymeric core is a recycled polymeric material.

Embodiment 3

The method as in any prior embodiment, wherein the polymeric core is a recycled rubber in a particulate form. Preferably, the recycled rubber has a size of about 3.5 to about 40 mesh.

Embodiment 4

The method as in any prior embodiment, wherein the curable thermoset coating comprises an uncured or partially cured thermoset including an epoxy resin, a phenolic resin, a vinyl ester resin, a furan resin, a polyurethane, a polyester, a cyanate ester, a polyimide, a bismaleimide, a liquid rubber or a combination comprising at least one of the foregoing.

Embodiment 5

The method as in any prior embodiment, wherein the curable thermoset coating further comprises a curing agent. The curing agent can include an amine, an oxygen-containing compound, elemental sulfur, a sulfur-containing compound, a peroxide, a Lewis acid, a Lewis base; or a combination comprising at least one of the foregoing.

Embodiment 6

The method as in any prior embodiment, wherein the coated polymeric particles have an average particle size of about 1,000 µm to about 7,000 µm.

Embodiment 7

The method as in any prior embodiment, wherein the treatment fluid further comprises a proppant. The proppant can comprise an uncoated proppant, a coated proppant, or a combination thereof. The weight ratio of the coated polymeric particles relative to the proppant can be about 10:90 to about 90:10.

Embodiment 8

The method as in any prior embodiment, wherein the forming the fluid-permeable pack comprises consolidating the coated polymeric particles with the coating during curing.

Embodiment 9

The method as in any prior embodiment, further comprising performing a downhole operation comprising one or more of the following: a hydraulic fracturing operation; an acidizing treatment; a gravel packing operation; or a flooding operation. Introducing the treatment fluid and the performing the downhole operation can occur simultaneously. Alternatively, performing the downhole operation precedes introducing the treatment fluid.

Embodiment 10

The method as in any prior embodiment, further comprising adjusting the permeability of the fluid-permeable pack by changing the size of the coated polymeric particles, the thickness of the curable thermoset coating, a composition of the curable thermoset coating, or a combination thereof.

Embodiment 11

The method as in any prior embodiment, wherein the fluid-permeable pack is disposed adjacent the subterranean formation.

Embodiment 12

The method as in any prior embodiment, wherein the fluid-permeable pack is disposed in a fracture created by a hydraulic fracturing operation.

Embodiment 13

The method as in any prior embodiment, further comprising installing a screen device in the wellbore. The fluid-permeable pack can be disposed in an annular area between the exterior of the screen device and the interior of the wellbore.

Embodiment 14

Coated polymeric particles comprising: a recycled polymeric core in a particulate form, and a curable coating disposed on the polymeric core, wherein recycled polymeric core has a size of about 3.5 to 40 mesh and comprises nitrile rubber (NBR), hydrogenated nitrile rubber (HNBR), styrene-butadiene rubber (SBR), ethylene propylene diene monomer rubber (EPDM), natural rubber, silicone rubber, polybutadiene, polyisoprene, butyl rubber, rubber blend, polyetheretherketone (PEEK), polyamide, polyimide, polysulfone, polyester, polycarbonate, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of treating a subterranean formation penetrated by a wellbore, the method comprising:
   introducing into the subterranean formation a treatment fluid comprising coated polymeric particles having a polymeric core and a curable thermoset coating disposed on the polymeric core, the polymeric core comprising a rubber, the rubber comprising a nitrile rubber (NBR), a hydrogenated nitrile rubber (HNBR), a styrene-butadiene rubber (SBR), an ethylene propylene diene monomer rubber (EPDM), a natural rubber, a silicone rubber, a polybutadiene, polyisoprene, butyl rubber, or a combination comprising at least one of the foregoing, the curable thermoset coating having a thickness of about 10 μm to about 50 μm, and the coated polymeric particles having a true specific gravity of about 0.5 g/cc to about 1.5 g/cc;
   allowing the curable thermoset coating to cure under downhole conditions;
   forming a fluid-permeable pack from the coated polymeric particles;
   flowing a formation fluid through the fluid-permeable pack from the subterranean formation into the wellbore; and
   reducing or substantially preventing the passage of formation particles from the subterranean formation into the wellbore.

2. The method of claim 1, wherein the polymeric core is a recycled rubber in a particulate form.

3. The method of claim 2, wherein the recycled rubber as a size of about 3.5 to about 40 mesh.

4. The method of claim 1, wherein the curable thermoset coating comprises an uncured or partially cured thermoset including an epoxy resin, a phenolic resin, a vinyl ester resin, a furan resin, a polyurethane, a polyester, a cyanate ester, a polyimide, a bismaleimide, a liquid rubber or a combination comprising at least one of the foregoing.

5. The method of claim 4, wherein the curable thermoset coating further comprises a curing agent.

6. The method of claim 5, wherein the curing agent comprises an amine, an oxygen-containing compound, elemental sulfur, a sulfur-containing compound, a peroxide, a Lewis acid, a Lewis base; or a combination comprising at least one of the foregoing.

7. The method of claim 1, wherein the coated polymeric particles have an average particle size of about 1,000 μm to about 7,000 μm.

8. The method of claim 1, wherein the treatment fluid further comprises a proppant.

9. The method of claim 8, wherein the proppant comprises an uncoated proppant, a coated proppant, or a combination thereof.

10. The method of claim 8, wherein the weight ratio of the coated polymeric particles relative to the proppant is about 10:90 to about 90:10.

11. The method of claim 1, wherein the forming the fluid-permeable pack comprises consolidating the coated polymeric particles with the coating during curing.

12. The method of claim 1, further comprising performing a downhole operation comprising one or more of the following: a hydraulic fracturing operation; an acidizing treatment; a gravel packing operation; or a flooding operation.

13. The method of claim 12, wherein introducing the treatment fluid and the performing the downhole operation occur simultaneously.

14. The method of claim 12, wherein performing the downhole operation precedes introducing the treatment fluid.

15. The method of claim 1, further comprising adjusting the permeability of the fluid-permeable pack by changing the size of the coated polymeric particles, the thickness of the curable thermoset coating, a composition of the curable thermoset coating, or a combination thereof.

16. The method of claim 1, wherein the fluid-permeable pack is disposed adjacent the subterranean formation.

17. The method of claim 1, wherein the fluid-permeable pack is disposed in a fracture created by a hydraulic fracturing operation.

18. The method of claim 1, further comprising installing a screen device in the wellbore.

19. The method of claim 18, wherein the fluid-permeable pack is disposed in an annular area between the exterior of the screen device and the interior of the wellbore.

* * * * *